United States Patent [19]

Birch et al.

[11] Patent Number: 5,293,470
[45] Date of Patent: Mar. 8, 1994

[54] DATA PROCESSING SYSTEM FOR DEFINING AND PROCESSING OBJECTS IN RESPONSE TO SYSTEM USER OPERATIONS

[75] Inventors: Gary J. Birch, Hemel Hempstead; Stephen J. Cook, Bishops Stortford; Alan S. Murphy, Hiltingbury; Patricia Tustin, Locks Heath, all of United Kingdom; John A. Woolsey, Chappaqua, N.Y.

[73] Assignee: International Business Machines Corporation, Armonk, N.Y.

[21] Appl. No.: 646,915

[22] Filed: Jan. 28, 1991

[30] Foreign Application Priority Data

Jan. 29, 1990 [EP] European Pat. Off. ........ 90300885.2

[51] Int. Cl.⁵ ............................................. G06F 15/00
[52] U.S. Cl. ................... 395/135; 395/153; 395/157; 395/158
[58] Field of Search ................. 395/135, 157, 158, 153

[56] References Cited

U.S. PATENT DOCUMENTS

| 4,757,309 | 7/1988 | Bowater et al. | 340/703 |
| 4,862,155 | 8/1989 | Dalrymple et al. | 340/747 |
| 4,870,397 | 9/1989 | Soto et al. | 340/747 |
| 4,954,970 | 9/1990 | Walker et al. | 395/135 |
| 5,212,770 | 5/1993 | Smith et al. | 395/155 |

FOREIGN PATENT DOCUMENTS 0280582 2/1988 European Pat. Off. ...... G09G 1/00

OTHER PUBLICATIONS

Smith, "The Alternate Reality Kit: An Animated Environment for Creating Interactive Simulations", IEEE Proceedings of Workshop on Visual Languages, Jun. 25-27, 1986, pp. 99-106.
"The Complete Hypercard Handbook", 2nd edition, chapter 6: All About Layers, 1988, pp. 109-117, Bantan Books, US, the whole chapter.
ACM Transaction on Graphics, vol. 5, No. 3, Jul. 1986, pp. 211-243, ACM, US, D. A. Henderson, Jr. et al.: "Rooms: The Use of Multiple Virtual Workspaces to Reduce Space Contention in a Window-Based Graphical User Interface", the whole document.

Primary Examiner—Mark K. Zimmerman
Attorney, Agent, or Firm—Douglas H. Lefeve

[57] ABSTRACT

In a data processing system which defines and processes objects and defines a plurality of virtual screens of display data with which views of objects can be associated, the system defines distinct anterior and posterior display layers for display, with the anterior layer having a background such that the content of the posterior display layer can be viewed therethrough and with one of the layers being assignable for the display of a selected virtual screen and the other display layer being dedicated for the display of an additional screen. The system also provides for the transfer of objects between the anterior and posterior display layers such that the dedicated layer can be used for transporting objects between virtual screens.

13 Claims, 8 Drawing Sheets

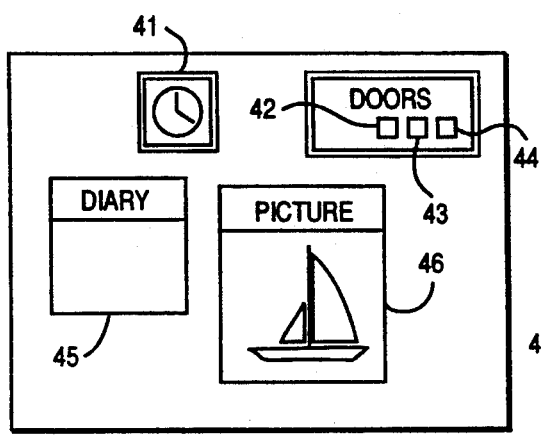
FIG. 4A
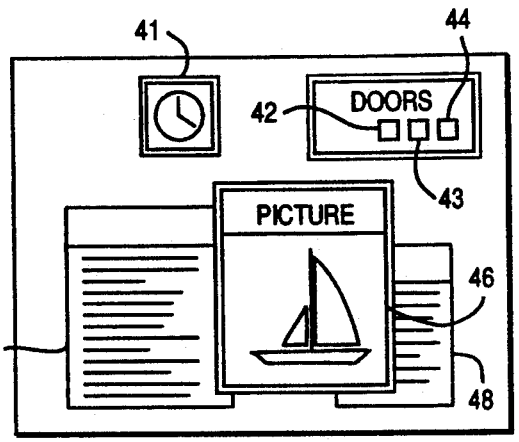
FIG. 4C
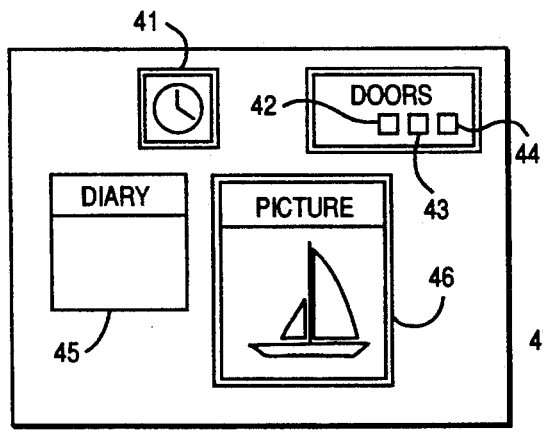
FIG. 4B
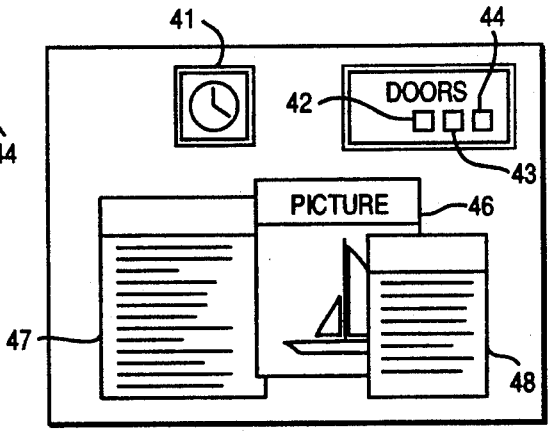
FIG. 4D
 = ON ASSIGNABLE LAYER
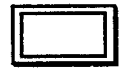 = ON DEDICATED LAYER

USER A

USER B

USER C

DATA PROCESSING SYSTEM FOR DEFINING AND PROCESSING OBJECTS IN RESPONSE TO SYSTEM USER OPERATIONS

TECHNICAL FIELD

The invention relates to a data processing system which defines and processes objects to carry out tasks in response to operations performed by a system user.

BACKGROUND ART

Data processing systems which permit the processing of data in a windowing environment have been known for some years and have made the interaction between users and the system more user-friendly. However, even with the use of windows, the management of all the information that users wish to place on the display screens of data processing systems may not be easy. For example, where a number of tasks are to be performed and there are possibly many overlapping windows on a screen, it is often difficult to arrange related windows in a meaningful way.

One approach to the structuring of data has been described by Henderson and Card in "Rooms: The Use of Multiple Workspaces to Reduce Space Contention in a Window-Based Graphical User Interface" —ACM Transactions on Graphics, Vol. 5, No. 3, July 1986, Pages 211-243. This article describes a system in which a plurality of virtual screens, or "rooms" are defined in each of which different tasks may be performed.

In order to change the room which is displayed this prior system makes use of the concept of a "door". A door is basically a icon which can be selected and causes the workspace to be changed. It will be appreciated that when one wants to change rooms, one might well want to take some of the items being processed from one room to another. The article refers to these items as "baggage". Despite the many advantages of the concept of "rooms", the selection and transfer of baggage from one room to another are rather cumbersome and time consuming processes.

The management of information is a problem particularly in multi-user systems. It has bene proposed to use workstations in a system which permits real time dynamic interaction between a plurality of users on what can be described as a "what you see is what I see" (WYSIWIS) basis. An example of such a system is described by Stefik et. al. in "Beyond the Chalkboard: Computer Support for Collaboration and Problem Solving in Meetings" —Communications of the ACM Vol. 30. No. 1, Jan. 1987, pages 32 to 47.

Stefik et. al. describe a data processing system comprising a plurality of workstations each having a display device. The aim of the system is to support a meeting between a number of users of the workstations. The system defines and processes objects in a windowing environment in response to operations performed by the users of the workstations for permitting concurrent real time communication between the users. A differentiation is made between public interactive windows and private windows accessible to only one user. The private windows violate the concept of strict WYSIWIS, but are necessary to enable effective communication. Thus, objects can be manipulated by a user in windows personal to that user on his or her workstation display device and then presented to a group of users in a window which can be viewed on the workstation display device of each of the group of users.

In the environment described by Stefik et. al, there is also the problem of the management of a large number of objects. In this case there is the specific problem of how to determine which of an individual users' objects are to be made available to the other users of the system.

SUMMARY OF THE INVENTION

The invention relates to a data processing system which defines and processes objects in a windowing environment for performing tasks in response to operations performed by a system user, defines a plurality of virtual screens of display data with which views of objects can be associated, and provides for the selection of a virtual screen whereby the views of the objects associated with the selected screen are displayed on a display device. An object of the invention is to enable the efficient transfer of objects between virtual screens in such a system.

In accordance with the invention, there is provided a data processing system which defines and processes objects for performing tasks in response to operations performed by a system user, defines a plurality of virtual screens of display data with which views of objects can be associated, and provides for the selection of a virtual screen whereby the views of the objects associated with the selected screen are displayed on a display device, characterized in that the system defines distinct anterior and posterior display layers for the display device with the anterior layer having a background such that the content of the posterior display layer can be viewed therethrough and with one of said layers being assignable for the display of the selected screen and the other thereof being dedicated for the display of an additional screen, the system additionally providing for the transfer of objects between the anterior and posterior display layers.

By associating workspaces with (at least) two separate layers for display, the interaction between the user and the machine becomes much easier than was possible in the past. Specifically, the present invention enables objects to be transferred between virtual screens through the use of the additional screen as a transport medium. The invention provides a mechanism whereby a user can select an object from a virtual screen selected for display in the assignable layer, transfer that object to the additional screen, change the virtual screen selected for display in the assignable layer and then transfer the object from the additional screen to a newly selected screen.

The provision of the separate display layers represents a fundamental departure from traditional window processing. Although previously it has been possible to overlay one window over another to give a layered effect, in practice the windows are all defined within one layer. This can be demonstrated by the fact that it is possible in existing display systems to change the order of the windows so that a first window co-extensive with and obscuring a second window can be caused to be obscured by the second window by changing the priority of the windows within the system. The present system can be arranged to permit the priority of objects within a display layer to be changed (as in the prior art), but not to freely allow the priority of the display layers to be changed. Thus, if a view of an object displayed in the anterior display layer obscures a view of a second object displayed in the posterior display layer, the second object cannot be made visible by some sort of order change. To make the second object visible, the first object could be moved out of the way by closing it down if it is a window, by scaling it, by simply moving it to the side or the like. Alternatively, the second window could be transferred to the anterior display layer by a predetermined operation or operations.

Preferably, the transfer of an object between display layers is performed by control logic which is responsive to a predetermined user input operation (eg. the operation of one, or more than one mouse button) at a time when a display cursor is located within the boundaries of that object on the display device. In this way, simple user interactions can give rise to the dropping of an object from the anterior to the posterior layer, or the picking up of an object from the posterior to the anterior layer. Moreover, if the X-Y coordinate position of the object on the display area of the display device is not changed during this operation, then no positional input need be given by the user to effect the transfer.

For managing the display of the views of the objects in the anterior and posterior display layers, the system preferably comprises control storage for containing a first list of identifiers for objects for display in the anterior display layer and a second list of identifiers for objects for display in the posterior display layer, the control logic updating the first and second lists in response to user operations and causing views of objects in the first list to be displayed in the anterior display layer, and the views of objects in the second list to be displayed in the posterior display layer on the display device.

It has been found advantageous for economic reasons for the anterior display layer to be dedicated to the display of the additional screen and the posterior display layer to be assignable to the selected screen. Where there are only two layers, therefore, the front display layer is dedicated to the display of the personal screen and the rear display layer is assignable to the selected screen.

It has also been found preferable for the anterior display layer to have a transparent background so that objects displayed in the posterior display layer can be clearly seen through that background. However, the background of the anterior layer could be translucent or partially transparent (eg. to give the effect of a colour wash). The background of the posterior layer will normally be opaque (eg. with a solid colour or pattern thereon). However, for some applications it may be desirable to have further layers behind the posterior layer. In such a case, it would be appropriate for the background of the posterior layer not to be opaque. Normally objects will be opaque so that the content of the posterior layer is obscured by objects displayed in the anterior layer. It should be noted however, that in some cases it may be desirable to make objects in the anterior layer at least partially "see-through".

In order to aid the distinguishing of the layers, it is preferable for the view of an object to vary according to the layer in which it is displayed. This can be achieved by differentiating the chrominance and/or luminance of a view of an object when displayed in the anterior display layer from the chrominance and/or luminance of that view of the object when displayed in the posterior display layer. Alternatively, or in addition, where an open view of an object is represented by a window surrounded by a patterned border, the pattern of the border of the window can be used to distinguish the display layers. Alternatively, or in addition, the content of the window can be presented differently. For example, the font, size or style of the text in, or title of a window displayed in the anterior layer could be made more striking by displaying the text bold and/or in italic and/or larger compared to text in a window displayed in the posterior layer.

Alternatively, or in addition, the separation of the first and second display layers could be highlighted by the definition of a third display layer between the anterior and posterior display layers, a translucent shadow of objects in the anterior layer being displayed onto the third display layer.

The invention finds application in a data processing system in the form of a single workstation. It also finds application in a multi-user system comprising a plurality of workstations where the users essentially work independently.

The invention finds particular application, however, in a multi-user system comprising a plurality of workstations which are able to communicate with one another. In this sort of system, an additional aim of the invention is to enable objects to be shared in an efficient manner between users. In such a system, the data processing system preferably comprises a plurality of interconnected workstations each having a display device, wherein, in response to user interaction with the system, a virtual display screen may be selected for display as a shared display screen in the assignable display layer of the display device of each of a group of workstations such that it may be shared by the users of the group of workstations.

The use of the assignable and dedicated layers provides true WYSIWIS on the assignable layer, the shared virtual screen being displayable with the same content at each participating workstation. The dedicated layer at each workstation contains the additional screen which can be used for information personal to the user of that workstation as well as for transferring objects between the shared virtual screen and other virtual screens displayable on the assignable layer at that workstation.

In this way it is possible for a user to select an object from a virtual screen on which he has been working at his workstation, to transfer that object to the additional screen at that workstation, to change the virtual screen currently displayed in the assignable layer to a virtual screen which may be shared by the group of users and then to transfer the object from the personal screen to the sharable screen. Other users who have access to the sharable screen can then access that object. Preferably, each of the group of users may interact with the shared screen at their respective workstations.

BRIEF DESCRIPTION OF THE DRAWINGS

A particular example of a data processing system in accordance with the invention will be described hereinafter with reference to the accompanying drawings in which:

FIGS. 4A-D illustrate information displayed on the display device of the workstation of FIG. 1 at a four successive times;

DESCRIPTION OF THE PREFERRED EMBODIMENTS

Figure 1:
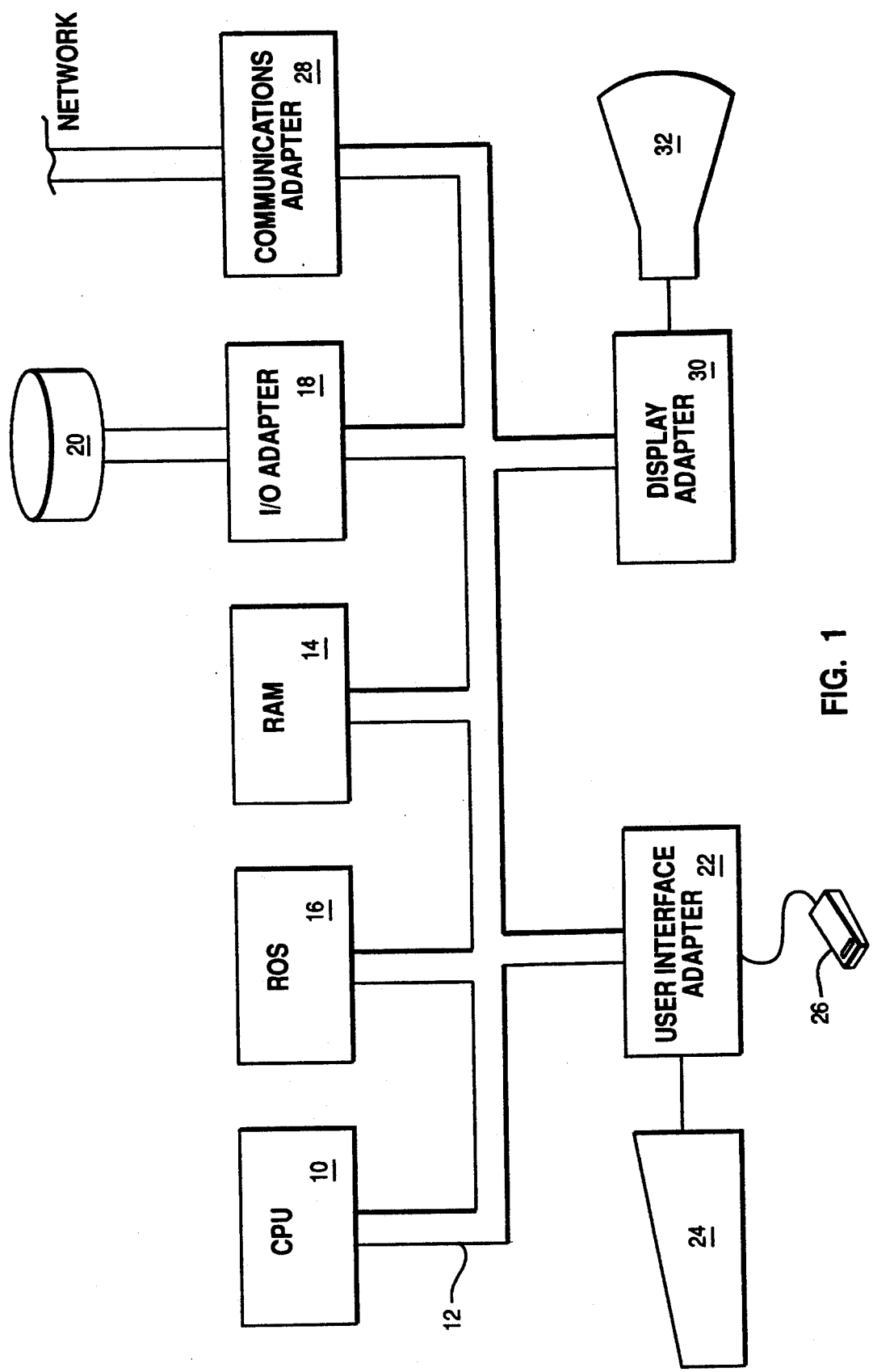
FIG. 1 is a block diagram illustrating the configuration of a typical workstation.

FIG. 1 illustrates a typical hardware configuration of a workstation with a central processing unit 10 (eg. a conventional microprocessor) and a number of other units interconnected via a system bus 12. The workstation shown in FIG. 1 includes a random access memory RAM 14, a read only store 16, and I/O adapter 18 for connecting peripheral devices such as disk units 20 to the bus, a user interface adapter 22 for connecting a keyboard 24 and/or a mouse 26 and/or other user interact devices (eg. a touch screen controller, not shown) to the bus, a communications adapter 28 for connecting the workstation to a data processing network and a display adapter 30 for connecting the bus to a display device 32.

The present invention can be implemented on a workstation as shown in FIG. 1 by the provision of appropriate control logic and control storage. Here the control logic is implemented as part of the operating system of the workstation and the control storage as part of the RAM 14. It should be noted that FIG. 1 illustrates only one example of a hardware configuration suitable for implementing the invention. The hardware of the workstation can be adapted to perform specific tasks as required. For example, a television camera may be connected into the system via the display adapter, or otherwise as appropriate, if it is desired in order to permit the use of video information. Similarly, a microphone and earphones may also be connected to the system as appropriate if it is desired to permit audio interaction. No details of such further features are given as such details are not crucial to the present invention. The invention could equally well be implemented on a mainframe data processing system or on a multi-user system. A specific example of the invention based on a multi-workstation system is described with reference to FIG. 5.

Irrespective of the hwardward configuration of an example of a data processing system in accordance with the invention, that system defines and processes objects in a windowing environment in response to operations performed by a system user. An "object" is an item (eg. a text file) which can be created and operated on in accordance with certain rules. Objects may be nested, that is, one object may include another object. They are owned by the user who created them. They have state and behavior. Objects may maintain access restrictions on themselves. As object-based operating systems are now well known in the art, no further description of the basic features of such an operating system is given.

Following accepted practice, views of an object may be displayed on the display 30 of the workstation of FIG. 1. A "view" is essentially the visible representation of an object. There may be one or more views of an object at any one time. A view may be in one of two or more states such as 'open' or 'closed'. A window is the open representation of a view. A window can normally be deleted, moved, sized or closed etc. It should be noted here that although a window is normally through of as being rectangular, this need not be the case. A window can take on any required shape. A closed view is represented by an icon. An icon may normally only be deleted, moved or opened.

In windowing systems, an analogy is often drawn between the surface of a display and the surface of a desk. The display of a workstation forms a workspace within which views of objects (i.e. the icons or windows for the objects) may be displayed in much the same way as documents may be laid out on a desk. Thus, views of objects (documents) may be laid out side by side and/or on top of one another on the display (desk) depending on the size of the documents compared to the available display (desk) area.

In a conventional windowing system, control logic controls the display of views of objects by maintaining a list of object identifiers (eg. pointers to the data defining the content of the objects). Where the view of an object is at least partially co-extensive with a view of another object, the view of a higher priority object is displayed in front of the view of the lower priority one as viewed on the display device. Given that the display device will normally only have a two-dimensional physical display surface, this is normally achieved by displaying in full the view of the higher priority object, with those parts of the view of the lower priority object which are co-extensive with it being clipped. This gives the impression that view of the higher priority object is in front of the view of the lower priority one. It is conventional to allow the items in the list to be reordered so that a window may be moved from the front to the back, or vice versa, as viewed on the display.

A data processing system in accordance with the invention differs from the prior art in that two screens of data (ie. two workspaces) can be displayed on a single physical display surface at a single time. By managing the data for display as if there were two physical display screens (eg. by maintaining two lists of object identifiers, one for each of the displayable screens of data), and then displaying both screens of data on a single display device using standard clipping techniques as described above, a conventional display device such as a cathode ray tube display may be used.

In order to enable user interaction, the system defines a cursor. The cursors can be generated in a conventional way by display logic in the individual workstations.

Figure 2:
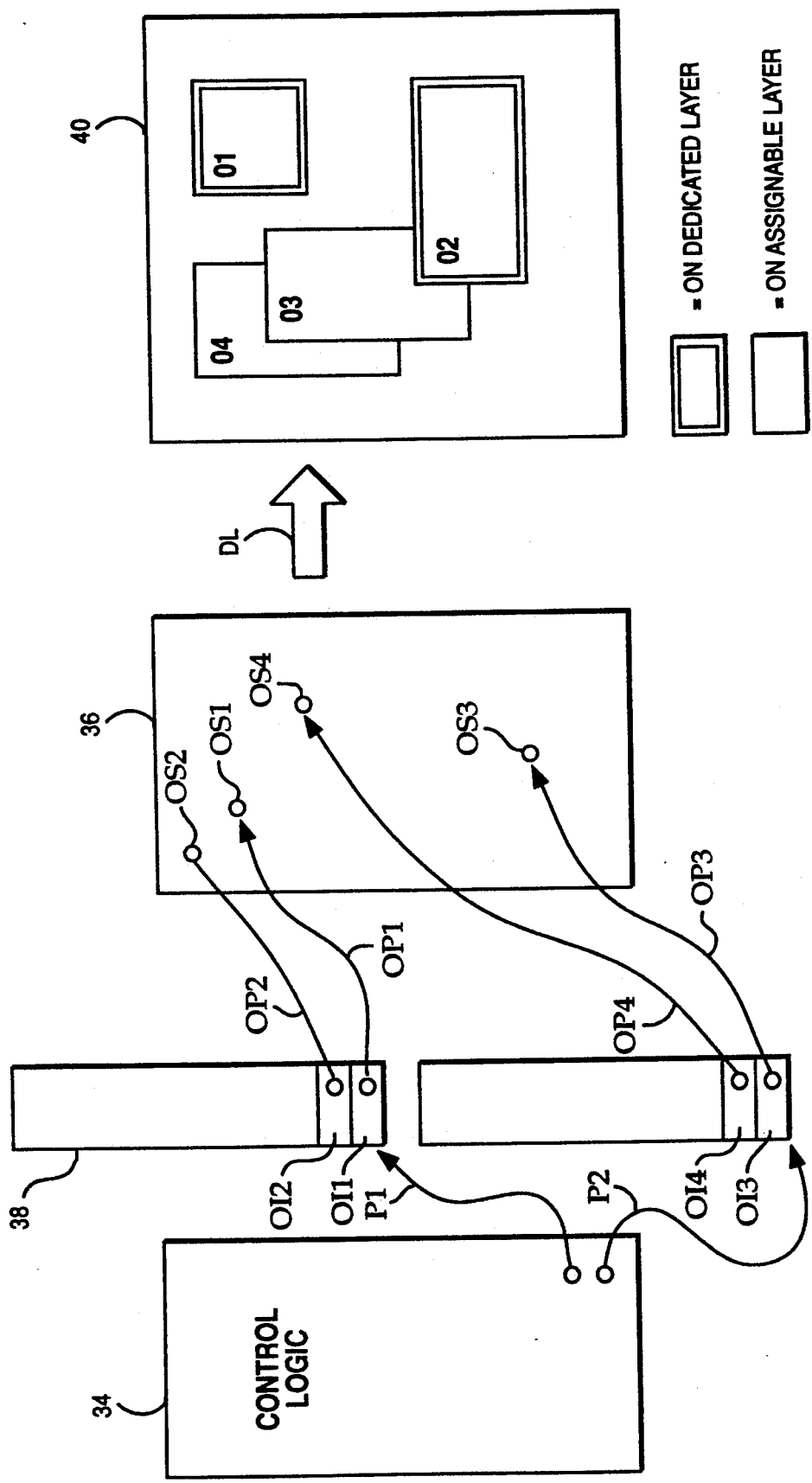
FIG. 2 is a schematic illustration of the relationship between control storage and control logic for a display system in accordance with the invention.

FIG. 2 illustrates the relationship between functional elements of the data processing system. Control logic 34, which here forms part of the operating system of the workstation, controls the partition of the display surface of the display device into two layers and may form part of the operating system of the workstation. Main data storage 36 is used for the storage of object data and forms part of the workstation RAM 14. It may also be configured, at least in part, on the disk drive 20 or other backing storage. Control storage 38 contains object identifiers indicative of the objects for display. Here they are pointers to object data in the main data storage 36. An object identifier may also specify the X-Y coordinates at which the object concerned should be displayed within the display area, although this information could equally well be held as part of the object data. The object identifiers are arranged as two lists, one for each display layer, with the objects being ordered in display priority within each list. The control storage 38 is here configured as part of the workstation RAM 14, but could also have been provided as special purpose registers. The display buffer 40 is here provided as special purpose memory in the display adapter 30, although it could have been configured in the workstation RAM 14.

In order to manage the simultaneous display of two screens of display data, the control logic maintains the two logically separate lists of object identifiers (eg. pointers to the data defining the content of the objects) one for each display layer. The two currently displayable screens are displayed in a respective one of those layers. Accordingly, the object identifiers for the objects in a displayable layer are contained in the appropriate list. A pointer to the first list is represented by an arrow P1 and a pointer to the second list is represented by an arrow P2. The object identifier OI1 and OI2 in the first list and the object identifiers OI3 and OI4 in the second list point to the data OS1, OS2, OS3, OS4 associated respectively with those objects (eg. object 1) will be complete virtual screens which are not concurrently being displayed, each virtual screen being stored as a list of object identifiers (OS1).

The control logic assigns a fixed display priority to the lists such that the first list has a higher display priority than the second list and any view of an object in the first list which is at least partially co-extensive with a view of an object in the second list always overlies the object in the second list as viewed on the display screen. Within each list, the objects are arranged in a conventional way by the control logic such that object identifiers are ordered according to display priority. Where a view of an object is at least partially co-extensive with a view of another object, the view of the higher priority object is displayed in front of the view of the lower priority one. By giving the first list a higher display priority than the second list, the display of the objects can then be performed by conventional display logic (represented by the arrow DL in FIG. 2) employing clipping techniques as mentioned above. The control logic permits reordering of objects in a conventional way within a list, but not between lists.

In the present example of a display system in accordance with the invention, the posterior layer (here the rearmost of two layers) is assignable to a selected one of a plurality of virtual screens, and the anterior layer (here the foremost of two layers) is dedicated to an additional screen. In FIG. 2, views of objects displayed on the dedicated (anterior) layer are represented by a double boundary, and views of objects displayed in the assignable (posterior) layer are represented by a single boundary. A virtual screen can be thought of as equivalent to a "desk" and the additional screen displayed in the dedicated layer as a "briefcase". This is because objects may be laid out within the virtual display screen much as physical documents can be laid out on a physical desk and the additional layer functions much as a brief case for transporting documents from one desk to another. For ease of transferring objects between the virtual screen currently selected for display and the additional screen, the selected screen and the additional screen are preferably co-extensive as viewed on the display device.

The provision of a plurality of virtual screens provides the possibility for a user of the data processing system to arrange the work to be done in a convenient manner. For example, the user may wish to work on both graphics files and text files, but not at the same time. In order to avoid cluttering up the display area of the display device with icons which relate to files he is not currently working on, he could arrange for a first virtual screen to contain the views of the text files and a second screen to contain the views of the graphics files. Only one of these screens will be displayed as the desk at any one time. In this embodiment of the invention, the selection of the virtual screen for display is made using "doors". Thus the desks can be thought of as being in separate rooms, access to the room having a particular desk being made by selecting the appropriate door.

The basic idea of a "door" has bene previously described by Henderson and Card in 'Rooms: The Use of Multiple Workspaces to Reduce Space Contention in a Window-Based Graphical User Interface'—ACM Transactions on Graphics, Vol. 5, No. 3, July 1986, Pages 211-243.

In the present system however, "doors" are a special form of object that provide the capability of changing the virtual screen assigned to the assignable layer. As doors are objects, they are viewed by door views. Doors are only present inclosed form (that is as an icon). Doors cannot normally by 'opened' into windows and are therefore regarded as being permanently in the closed state. Doors can be freely deleted, copied, moved, stored inside folders, notes etc.

A Door's View normally appears within the additional screen on the dedicated display layer. Doors may be added or deleted by the system from the additional screen—eg. when a user successfully goes through a door, (i.e. he or she calls up a virtual screen onto the working layer), that door may be removed from the additional screen and a new door may be placed there. However, some or all of the doors can be taken with him as he "moves" from "room" to "room". These allow the user access to other virtual screens from the currently selected one.

When a door is selected by the user, the system saves the second list object identifiers from the control stage in the main data data storage and uses the object identifier from the saved list for the newly selected door to access the list of object identifiers for the corresponding virtual screen. The list of object identifiers for the newly selected virtual screen then overwrites the previous object identifiers in the second list and the display is updated with the new display data.

The primary purpose of the display layer dedicated to the additional screen is to provide an efficient mechanism for transporting objects from one virtual screen to another. The requirement for this could arrive when the user of the system wants to collate some of the text and graphics files he has been working on in different virtual screens into a single virtual screen, (eg. for preparing an illustrated article).

The additional screen can be used to hold certain items which are personal to the user as well as to transfer objects between virtual screens. This additional screen can also be used for the processing of tasks in the same way as a virtual screen.

The operations the user performs in moving an object from a first (source) virtual screen to a second (destination) one can be summarized as follows:

1) Select the source screen for display using the appropriate door (this causes the object identifiers for that screen to be loaded into the second list and the objects associated therewith to be displayed).

2) Place cursor within the boundaries of the object to be moved and click a predetermined mouse button or buttons (this causes the object identifier for the selected object to be moved from the second to the first display list, the object data to be modified as appropriate and the display to be updated).

3) Select a destination screen for display using an appropriate door (this causes the list of object identifiers for the source screen to be saved in object storage and the list of object identifiers for the destination screen to be loaded into the second list).

4) Place cursor within the boundaries of the object to be moved and click a predetermined mouse button (this causes the object identifier for the selected object to be moved from the first to the second display list, the object data to be updated as appropriate and the display to be updated).

Figure 3:
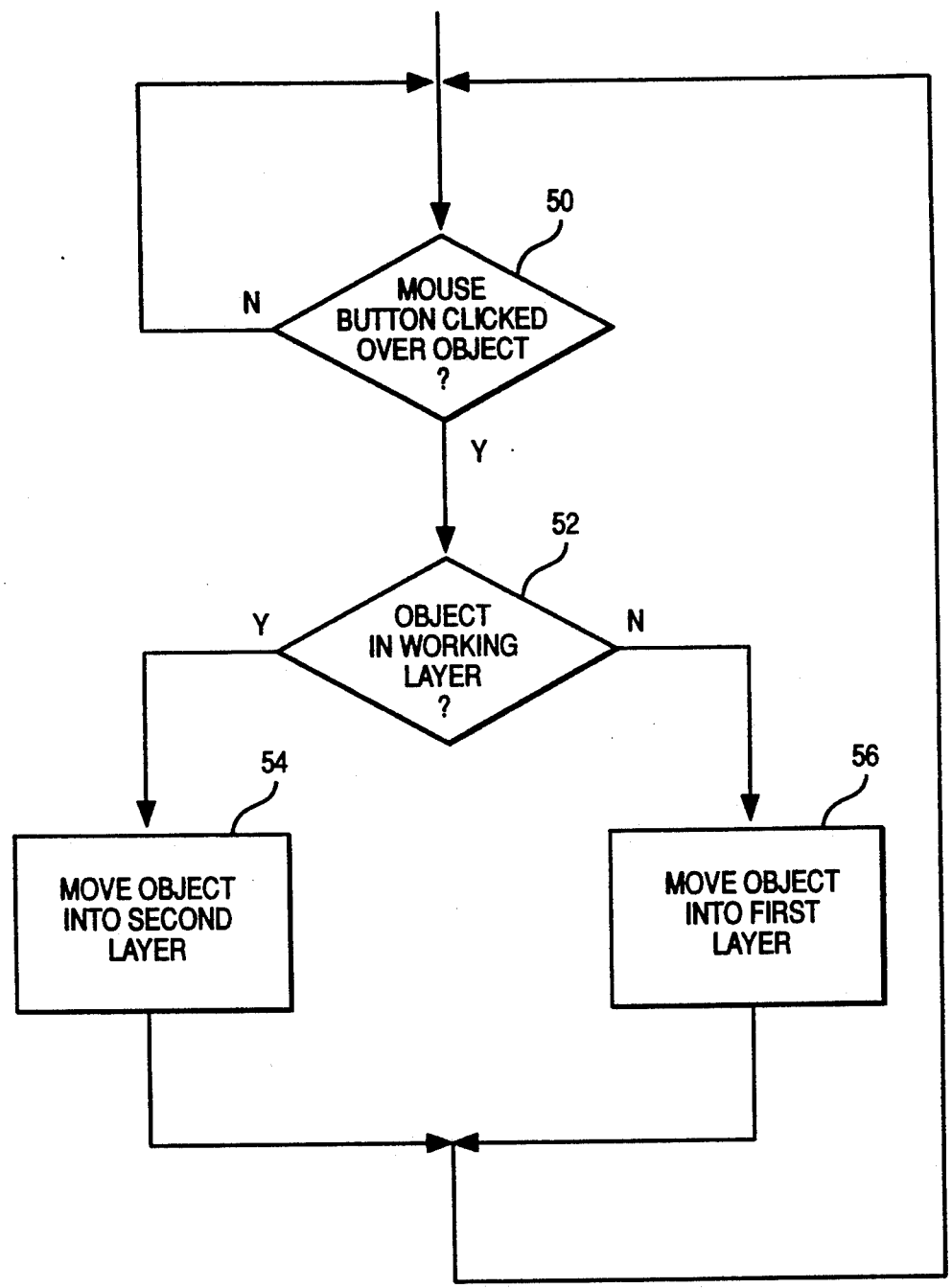
FIG. 3 illustrates part of the control logic of FIG. 2.

FIG. 3 represents the logic involved for transferring objects between the lists for the currently displayable screens in response to the user operations described above. A test is made at 50 whether a predetermined mouse button (or buttons) has (have) been clicked when a display cursor lies within the boundary of an object on the display surface. If this is the case, then the control logic 34 determines, at step 52, whether the identifier for the object in question is in the first list (i.e. in the dedicated layer). If it is, the control logic transfers, at step 54, the object identifier concerned into the second list. Otherwise the control logic transfers, at step 56, the object identifier concerned into the first list. In either case the object definition data is updated to change the visual appearance of the object concerned and the display buffer is then updated with the changed display data.

The anterior display layer has a transparent background so that objects displayed in the posterior display layer can be clearly seen through that background. In tis way, conventional display logic can be used to display the object data identified by the two lists simply by overlaying object views. Alternatively, the background of the anterior layer could be translucent or partially transparent (eg. to give the effect of a colour wash).

The background of the posterior layer will normally be opaque (eg. with a solid colour or pattern thereon). The colour and/or patterning of the posterior layer can be used to identify the selected virtual layer. In some applications, it may be desirable to have further layers behind the posterior layer. In such applications, it would be appropriate for the background of the posterior layer not to be opaque.

Normally objects will be opaque so that the content of the posterior layer will be obscured by objects displayed in the anterior layer. It should be noted however, that in some cases it may be desirable to make objects in the anterior layer at least partially "see-through".

In order to aid the differentiation between the view of an object when displayed in the anterior layer (here the dedicated layer) from the view of that object when displayed in the posterior layer (here the assignable layer), the view may be visually distinguished in an appropriate manner. For example, the chrominance and/or luminance of a view of an object when displayed in the anterior display layer may be different from the chrominance and/or luminance of that view of the object when displayed in the posterior display layer. This can be achieved by the step of modifying the object definition data as appropriate in the main data storage when objects are transferred between layers. However, this could alternatively be achieved by providing display logic DL which processes data for display in accordance with the layer in which it is to be displayed. Alternatively, or in addition, the boundary of an object could be changed as in FIG. 2. Alternatively, or in addition, the content of the window can be presented differently. For example, the font, size or style of the text in, or title of a window displayed in the anterior layer could be made more striking by displaying the text bold and/or in italic and/or larger compared to text in a window displayed in the posterior layer.

FIG. 4 illustrates information displayed on the display device of the workstation of FIG. 1 at four successive times, A, B, C and D.

At time A, the user of the workstation sees various objects, namely clock 41, doors 42, 43, 44 on the dedicated layer (which can be thought of as the user's briefcase) and a diary 45 and a picture 46, on the assignable layer (which can be thought of as the user's desk). Views of objects on the dedicated layer are surrounded by double lines, those on the assignable layer by a single line.

Time B represents the display following the packing up of the picture 46 from the assignable layer (from the desk) to the dedicated layer (into the briefcase). To do this, the user manoeuvres the system cursor so that it lies within the boundary of the picture 46 and clocks a predetermined mouse button or buttons. In response to these user operations, the system moves the object identifier from the second to the first list, modifies the definition of the object boundary in the object definition data and then updates the display.

Time C represents the display following the selection of another virtual screen (another desk) for display in the assignable layer. This selection consisted of the user manoeuvring the cursor over the door icon 42 and clicking an appropriate mouse button. In response to these user operations, the system saves the list of object identifiers for the source screen in object storage, loads the list of object identifiers for the destination screen into the second list and updates the display with the views of the objects in the destination screen on the assignable layer. It can be seen in FIG. 4C that the assignable layer lies behind the dedicated layer. The destination screen contains two text documents 47 and 48.

Time D represents the display following dropping of the picture from the dedicated layer (from the briefcase) to the assignable layer (onto the newly selected desk) and reordering of the objects within the assignable layer. To drop the picture, the user manoeuvres the system cursor so that it lies within the boundary of the picture 46 and clicks a predetermined mouse button or buttons. In response to these user operations, the system moves the object identifier from the first to the second list, modifies the definition of the boundary in the object definition data and then updates the display. The order of the objects within the assignable layer can then be altered as required in a conventional manner to arrive at the display at time D. It should be noted that the interposing of the picture between the two text documents 47 and 48 on the assignable layer is only possible if the picture is also on the assignable layer. It could not have been achieved by a simple reordering of the objects at time C, for example, because the picture 46 was in a different layer from the text documents 47 and 48.

Figure 5:
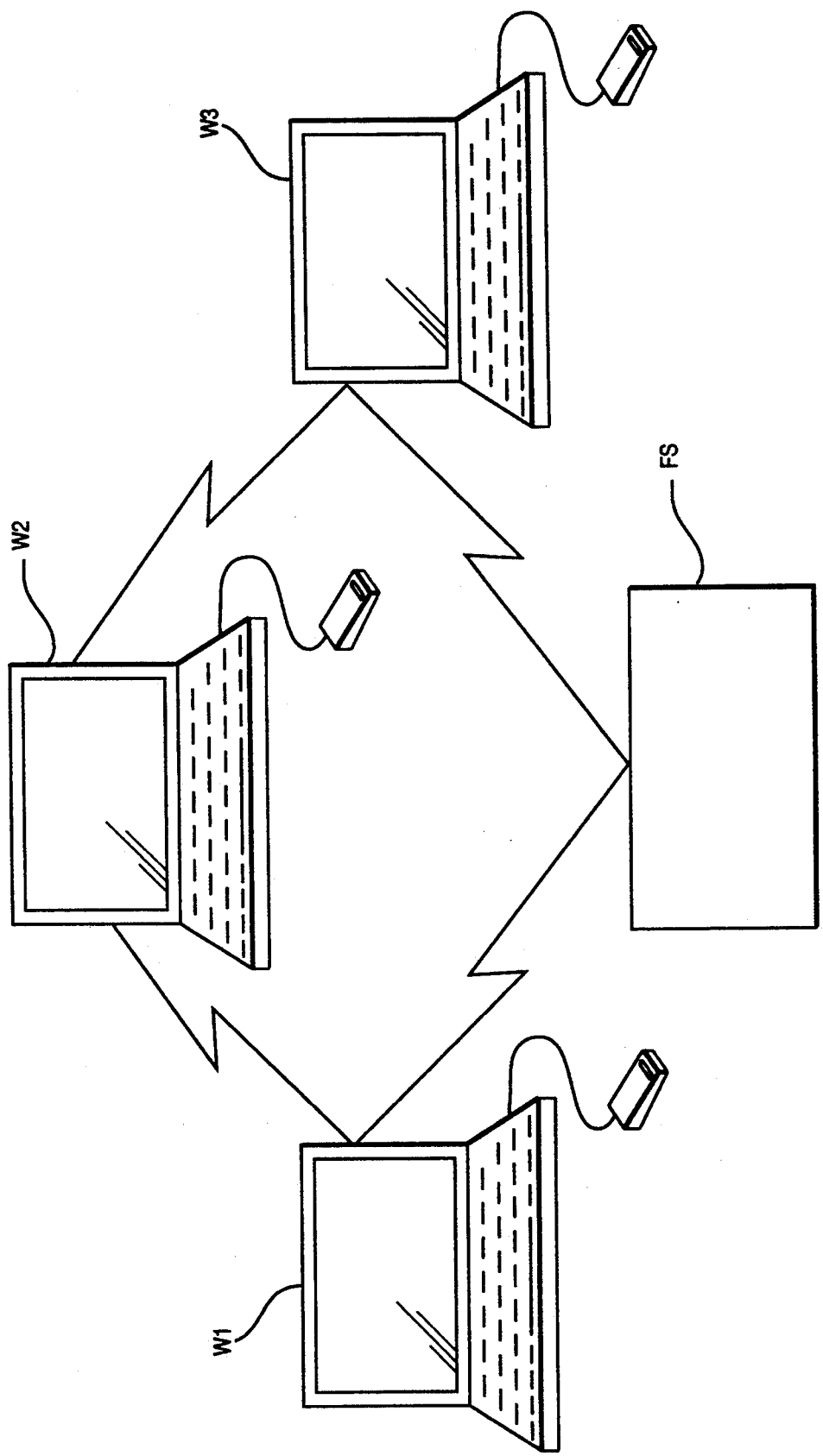
FIG. 5 is a schematic diagram of a data processing system comprising three workstations and a file server.

FIG. 5 represents a data processing system comprising a plurality of workstations (here three workstations W1, W2 and W3) interconnected so as to permit communication between the workstations. It is assumed that the data processing system of FIG. 5 is of a type that will permit concurrent real time communication between the users. In FIG. 5 the workstations are connected as part of a local area network under the control of a file server FS to a host system. The network operates under a conventional network protocol (eg. a token ring protocol). FIG. 5 illustrates one hardware configuration for a data processing system in accordance with the invention and having a plurality of interconnected workstations. Other configurations are possible. For example, a data processing system in accordance with the invention could be could be based on a star network, or based on a host processor with a plurality of dumb terminals or on a plurality of remote processors connected by a communications network. All the workstations could be located within a single room, or within a local area (eg. in a building) or may be remote from one another.

In the data processing system in accordance with the invention and based on the configuration of FIG. 5, it is assumed that each of the workstations (eg. workstations as in FIG. 1) has control logic and control storage corresponding to that illustrated in FIG. 2. The control logic 34 of FIG. 2 can be an integral part of the operating system of each workstation, although it could be separate. The main data storage 36 can form part of the workstation RAM and/or be configured on the disk drive 20. It could also be configured, at least in part, on the storage of the file server FS. The control storage 38 is preferably configured as part of the workstation RAM 14, but could also been provided as special purpose registers. For high performance, it is preferable for the display buffer 40 to be provided as special purpose memory in the display adapter 30, although it could have been configured in the RAM 14 of each workstation.

When a virtual screen of data is shared by a group of workstations, it is described as a shared screen. The objects associated with a shared screen will be stored such that each workstation has access to the appropriate data whereby each user that has access to a shared screen can have an identical display of that shared screen on his workstation display device. A shared screen is displayed on the assignable layer of the display device of each of the workstations where the user has selected that shared screen as the virtual screen for display. The users of the various workstations having access to the shared screen can interact with that screen to modify its contents in accordance with an appropriate access protocol.

Shared objects and shared virtual screens are replicated in each of the participating workstations. In order to ensure data integrity, a token passing protocol is employed such that only the workstation in current possession of the token is able to update the shared information. Token passing protocols are well known in the art and will not be discussed further herein. It will be apparent that other data structures and protocols could be used to ensure data integrity. For example, a master version of the objects could be held on the storage of the file server, with restricted access for writing and global access for reading from the master copies. At any one time, one user could have access to the master copy, any changes being communicated to all the participating workstations.

The virtual screen selected for display at each workstation is displayed on the assignable layer of that workstation. An additional screen is displayed on the dedicated layer of each workstation, the additional screen displayed at each workstation being private to the user of that workstation. This additional screen i used to hold certain items which are private to the user and is also used to transfer objects between virtual screens at that workstation. An additional screen can also be used for the processing of tasks in the same way as a virtual screen. The data for the items associated with each additional screen are preferably stored in the memory of the workstation concerned.

In order to facilitate user interaction, the system defines cursors for each user which have a specific appearance on his or her own screen. The cursors can be generated in a conventional way by the display logic in the individual workstations. Although not relevant to he present invention it is noted that cursors which appear on a shared screen, but belong to another screen (eg. on another workstation) can be represented on a remote screen using a 'foreign' appearance. The positions of pointers foreign to a screen might be represented using a shadow or outline version of the pointer and/or be labelled to identify the wonders.

It will be appreciated that many details of the display logic are not shown in the Figures for reasons of clarity and ease of explanation. The detailed implementation of features such as the management of the distribution of the object data between various storage elements as this is not significant to the present invention and consequently can be implemented in any suitable way as will be apparent to the person skilled in the art.

The user of a workstation can transfer objects between screens at a workstation and can select a virtual screen for display using a door with operations comparable to those for the single workstation example described earlier.

Figure 6A:
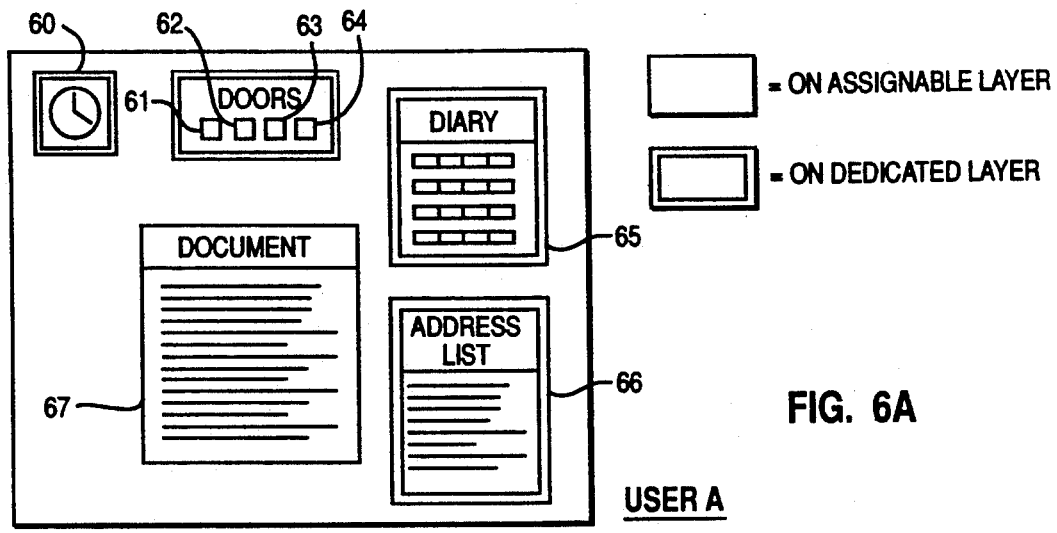
FIGS. 6A-C illustrate information displayed at the three workstations of FIG. 5 at a first time.
Figure 6B:
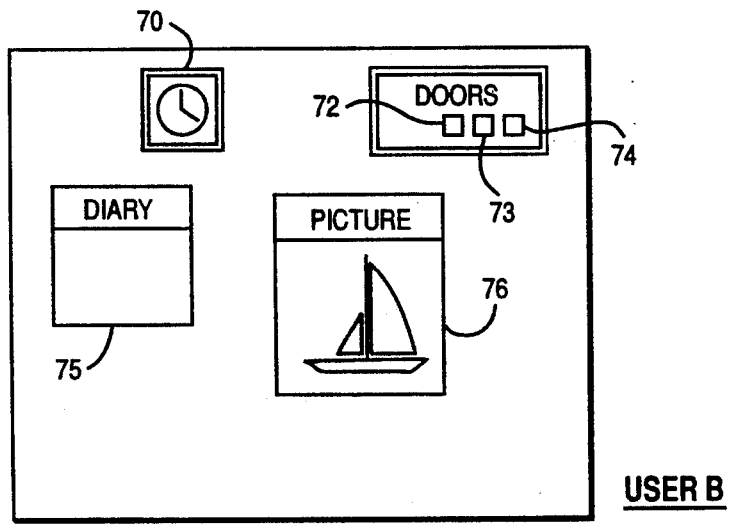
Figure 6C:
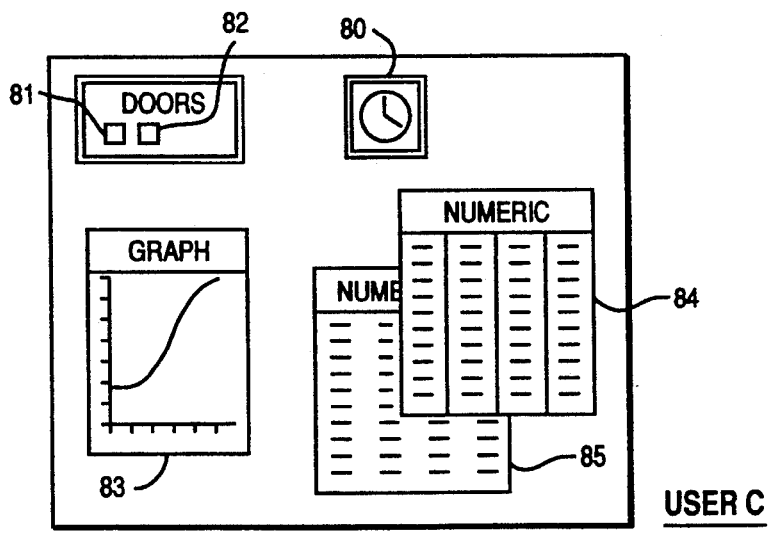
Figure 8A:
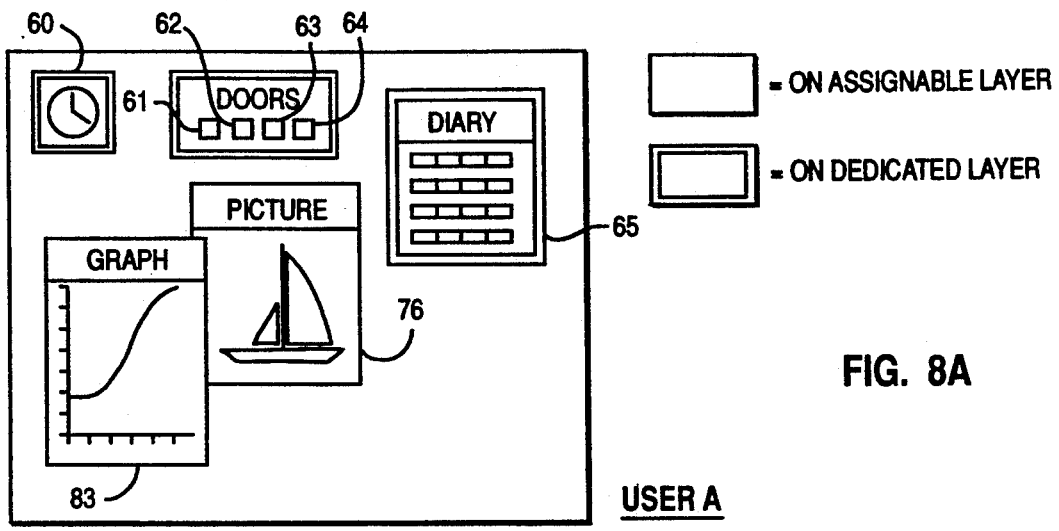
FIGS. 8A-C illustrate information displayed at the three workstations of FIG. 5 at a third time.
Figure 8B:
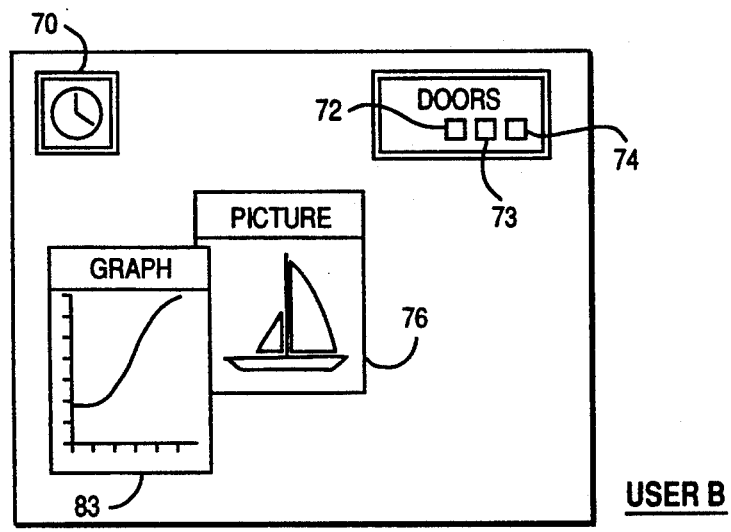
Figure 8C:
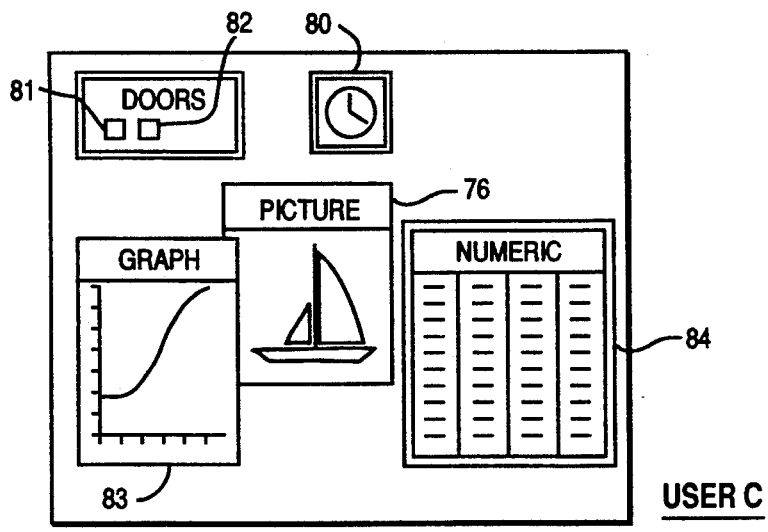

FIGS. 6 and 8 illustrate an example of the interactions between users A, B and C of the three workstations W1, W2 and W3, respectively, of FIG. 5.

In FIG. 6, user A of workstation W1 sees a document 67 displayed on a layer assigned to a virtual screen (which can be thought of as user A's desk) and a clock 60, doors 61, 62, 63, 64, a diary 65 and an address list 66 displayed in a layer dedicated to an additional screen (which can thought of as user A's briefcase). The assignable layer lies behind the dedicated layer.

User B of workstation W2 sees a diary 75 and a picture 76 displayed on a layer assigned to a virtual screen (which can be thought of as user B's desk) and a clock 70 an doors 72, 73, 74 displayed on a layer dedicated to an additional screen (which can be thought of as user B's briefcase). The assignable layer lies behind the dedicated layer.

User C of workstation W3 sees a graph 83 and numeric information 84, 85 displayed on a layer assigned to a virtual screen (which can be thought of as user C's desk) and a clock 80 and doors 81, 82 displayed on a layer dedicated to an additional screen (which can be thought of as user C's briefcase). The assignable layer lies behind the dedicated layer.

Figure 7A:
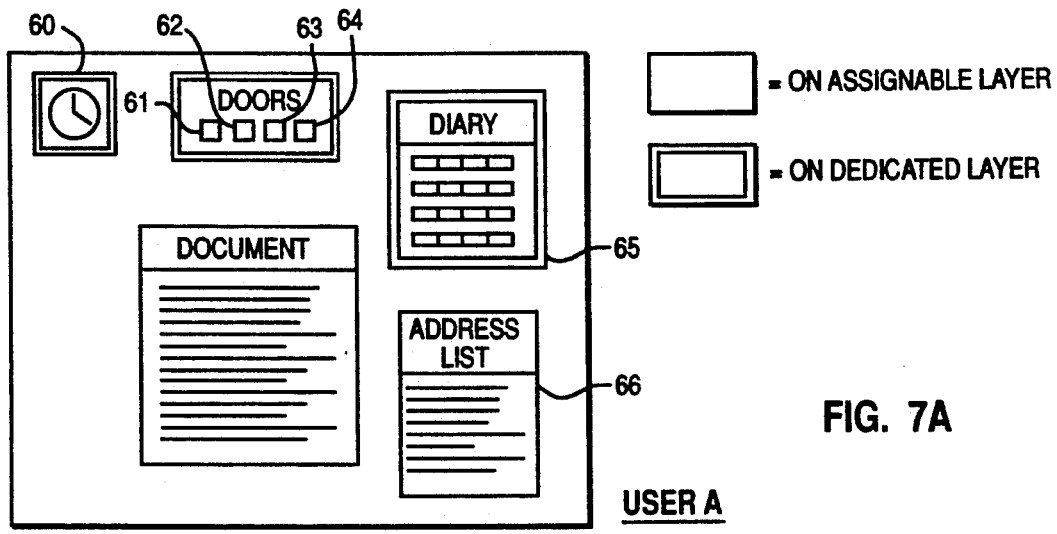
FIGS. 7A-C illustrate information displayed at the three workstations of FIG. 5 at a second time.
Figure 7B:
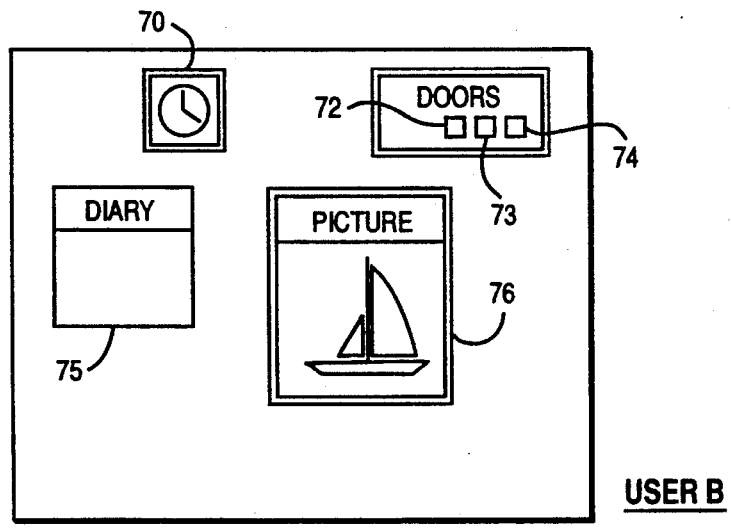
Figure 7C:
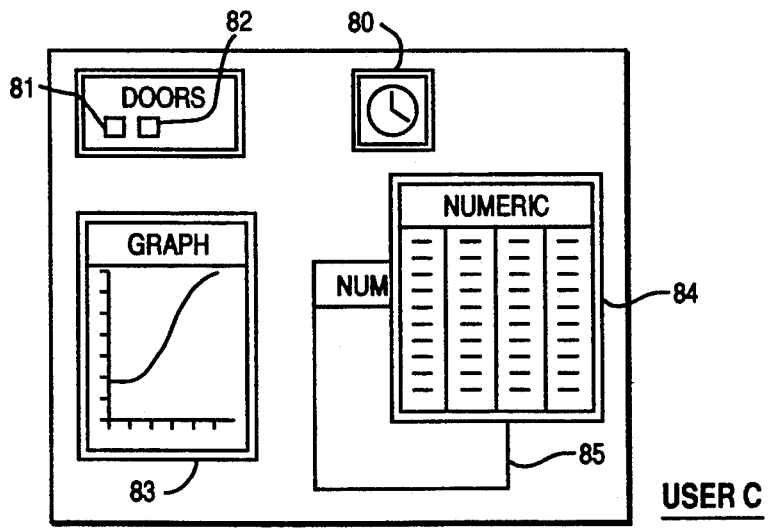

A a time between that represented by FIGS. 6 and 7 it is assumed that the three parties decide that they wish to process information in a shared screen. This decision may, for example, have been reached by a telephone call, or by an exchange of information over the system, but that is not important here.

FIG. 7 represents the stage when the users have arranged on their respective additional screens the information which they wish to take with them to the shared screen (i.e. their baggage). In order to rearrange the objects, the users each manoeuvre their respective cursors to within the boundaries of the appropriate objects and click a predetermined mouse button or buttons.

Thus, user A has decided to drop the address list 66 from his additional screen onto a corresponding position on the displayed virtual screen (i.e. to drop the address list from his briefcase onto the desk) by located the cursor within the boundary of the address list and clicking the appropriate mouse button or buttons. In response to this the system moves the object identifier for the address list from the second display list to the first display list, changes the object data defining the appearance of the object boundary and updates the display at workstation W1.

User B picks up picture 76 from his selected screen (his desk) to his additional screen (into his briefcase) by locating the cursor within the boundary of the picture and clicking the appropriate mouse button or buttons. In response to this the system moves the object identifier for the picture from the first display list to the second display list, changes the object data defining the appearance of the object boundary and updates the display at workstation W2. Similarly, user C picks up the graph 83 and one of the numeric tables 84 from his selected screen (his desk) to his additional screen (into his briefcase).

FIG. 8 represents a later stage when all of the users have entered the shared screen (shared desk) by selecting the appropriate door. It is assumed in this case that each user already had the appropriate door icon.

User A does not drop anything from his additional screen, but sees the picture 76 and the graph 82 when these are dropped onto the shared screen by user B and user C respectively.

User B drops the picture 76 from his additional screen onto the shared screen by locating the cursor within the boundary of the picture and clicking the appropriate mouse button or buttons. In response to this the system moves the object identifier for the picture from the second display list to the first display list, changes the object data defining the appearance of the object boundary and causes the display at each of the workstations W1, W2 and W3 to be updated in accordance with the applicable system structure and protocols as mentioned earlier. User B also sees the graph 83 dropped onto the shared screen by user C.

User C similarly drops the graph 76 from his additional layer onto the shared screen. User C also sees the graph 83 dropped onto the working perspective by user B.

When the objects have been dropped onto the shared screen, they can be processed by any of the users which have access to that screen, subject to the applicable system protocols as mentioned earlier.

It can be seen that the present invention provides a user-friendly mechanism for the interchange of objects between workspaces. In a multi-user system, this provides users with an effective framework for setting up multi-user concurrent processing.

Although the present invention has been described with reference to a specific embodiment, it will be appreciated that many modifications and/or additions are possible within the scope of the invention as claimed.

For example, although an embodiment has been described which comprises conventional hardware, the invention could be implemented, at least in part, by special purpose hardware. For example, separate display buffers could be employed for the storage of the working and second display layers. The video bit streams from these two layers could then be logically combined to provide a single bit stream for driving the display device. The combination logic could be arranged to display the bit stream from the second layer except when a colour "transparent" was detected, in which case the bit stream from the working layer would be displayed.

Although the particular example described herein has two different display layers, other examples of a display system may have more than two different display layers. In this case the control logic would nee to process a corresponding number of display lists. A specific example of a three layer system would be where the separation of the first and second display layers is highlighted by the definition of a third, shadow, display layer between the anterior and posterior display layers. The system could then be arranged to generate a translucent shadow of objects in the anterior layer which is slightly displaced from those objects in the X-Y display planes (eg. to the side and/or above or below those objects) and to display these in the third layer.

Instead of using a mouse button, or buttons, to instigate the transfer of an object between displayed screens, a keyboard interaction or other user interface interaction (eg. a touch screen technique) could be used.

We claim:

1. In a data processing system including a plurality of interconnected workstations, each having an attached display device, in which said system defines and processes objects in response to operations performed by a system user, defines a plurality of virtual screens of display data with which views of objects can be associated, and provides for selection of a virtual screen whereby views of objects associated with a selected screen are displayed on a display device, the improvement comprising:

means for defining distinct anterior and posterior display layers for said display device with said anterior layer having a background such that a content of said posterior display layer can be viewed therethrough and within of said layers being assignable for display of said selected screen and another of said layers being dedicated for display of an additional screen;

means including control logic means which is responsive to a predetermined user input operation and a presence of a display cursors within a boundary of at least one of said objects for transferring said at least one of said objects between said anterior and posterior display layers;

wherein a view of said at least one of said objects varies in dependence upon a one of said display layers in which it is displayed; and means, in response to user interaction with said system, for selecting a virtual display screen as a shared display screen in an assignable display layer of each of said attached display devices such that said assignable display layer may be shared by users of said plurality of workstations.

2. The data processing system of claim 1 further comprising control storage means responsive to said control logic means for storing a first list of identifiers for objects for display in said anterior display layer and a second list of identifiers for objects for display in the posterior display layer.

3. The data processing system of claim 2 wherein said control logic means further comprises means for updating said first and second list in response to user operations and causing views of objects in said first list to be displayed in said anterior display layer, and the views of objects in said second list to be displayed in said anterior displayed layer, and the views of objects in said second list to be displayed in said posterior display layer.

4. The data processing system of claim 3 wherein said anterior display layer is dedicated to display of said additional screen and said posterior display layer is assignable to said selected screen.

5. The data processing system of claim 4 wherein said anterior display layer comprises a transparent background.

6. The data processing system of claim 3 wherein a chrominance characteristic of a view of at least said one of said objects when displayed in said anterior display layer differs from said chrominance characteristic of said view of said at least one of said objects when displayed in said posterior display layer.

7. The data processing system of claim 3 wherein a luminance characteristic of a view of at least said one of said objects when displayed in said anterior display layer differs from said luminance characteristic of said view of said at least one of said objects when displayed in said posterior display layer.

8. The data processing system of claim 3 wherein a format of a view of at least one of said objects when displayed in said anterior display layer differs from said format of said view when displayed in said posterior display layer.

9. The data processing system of claim 3 further comprising means for defining a third display layer between said anterior and posterior display layers; and
means for displaying on said third display layer, representations of shadows of views of objects displayed on said anterior layer.

10. The data processing system of claim 3 wherein said predetermined user operation is operation by a user of a predetermined mouse button.

11. In a data processing system including a plurality of interconnected workstations, each having an attached display device, in which said system defines and processes objects in response to operations performed by a system user, defines a plurality of virtual screens of display data with which views of objects can be associated, and provides for selection of a virtual screen whereby views of objects associated with a selected screen are displayed on a display device, a method comprising:
defining distinct anterior and posterior display layers for said display device with said anterior layer having a background such that a content of said posterior display layer can be viewed therethrough and with one of said layers being assignable for display of said selected screen and another of said layers being dedicated for display of an additional screen;
transferring, with control logic means which is responsive to a predetermined user input operation and a presence of a display cursor within a boundary of at least one of said objects, said at least one of said objects between said anterior and posterior display layers for display on said display device;
varying a view of said at least one of said objects in dependence upon a one of said display layers in which it is displayed; and
selecting a virtual display screen as a shared display screen in an assignable display layer of each of said attached display devices such that said assignable display layer may be shared by users of said plurality of workstations.

12. The method of claim 11 further comprising storing, in a control storage, a first list of identifiers for objects for display in said anterior display layer and a second list of identifiers for objects for display in the posterior display layer.

13. The method of claim 12 further comprising:
updating said first and second list in response to user operations;
displaying, in said anterior display layer, views of objects in said first list; and
displaying, in said posterior display layer, views of objects in said second list.

* * * * *

UNITED STATES PATENT AND TRADEMARK OFFICE
CERTIFICATE OF CORRECTION

PATENT NO. : 5,293,470
DATED : Mar. 8, 1994
INVENTOR(S) : Gary J. Birch, Hemel Hempstead, Stephen J. Cook, Alan S. Murphy, Patricia Tustin and John A. Woolsey It is certified that error appears in the above-identified patent and that said Letters Patent is hereby corrected as shown below:

Col. 8, line 12, please delete "bene" and insert --been--;
      line 39, please delete "stage" and insert --storage--;

Col. 10, line 22, please delete "packing" and insert --picking--;

Col. 12, line 37, please delete "and" and insert --to--;
      line 50, please delete "an" and insert --and--;

Col. 13, line 9, please delete "located" and insert --locating--;

Col. 14, line 44, please delete "within" and insert --with one--;
      line 50, please delete "cursors" and insert --cursor--;

Col. 15, line 6, please delete "anterior";
      line 7, please delete the entire line; and
      line 8, please delete "list to be displayed in said".

Signed and Sealed this

Twenty-fifth Day of April, 1995

Attest:

BRUCE LEHMAN

Attesting Officer      Commissioner of Patents and Trademarks